United States Patent
Prajapat et al.

(10) Patent No.: US 7,849,144 B2
(45) Date of Patent: Dec. 7, 2010

(54) SERVER-INITIATED LANGUAGE TRANSLATION OF AN INSTANT MESSAGE BASED ON IDENTIFYING LANGUAGE ATTRIBUTES OF SENDING AND RECEIVING USERS

(75) Inventors: Surendra Prajapat, Indore (IN); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 783 days.

(21) Appl. No.: 11/388,982

(22) Filed: Mar. 27, 2006

(65) Prior Publication Data

US 2007/0168450 A1 Jul. 19, 2007

Related U.S. Application Data

(60) Provisional application No. 60/758,546, filed on Jan. 13, 2006.

(51) Int. Cl.
*G06F 15/16* (2006.01)

(52) U.S. Cl. .......................... 709/206; 709/203; 704/9; 704/231; 704/277

(58) Field of Classification Search ................. 709/206, 709/203; 704/9, 231, 277
See application file for complete search history.

(56) References Cited

U.S. PATENT DOCUMENTS

| | | | | |
|---|---|---|---|---|
| 5,497,319 A * | 3/1996 | Chong et al. | ................. | 704/2 |
| 5,987,401 A * | 11/1999 | Trudeau | ................. | 704/2 |
| 6,216,157 B1 | 4/2001 | Vishwanath et al. | | |
| 6,292,769 B1 * | 9/2001 | Flanagan et al. | ................. | 704/3 |
| 6,598,015 B1 * | 7/2003 | Peterson et al. | ................. | 704/3 |
| 6,892,206 B2 | 5/2005 | Dharap | | |
| 6,907,447 B1 * | 6/2005 | Cooperman et al. | ......... | 709/203 |
| 6,950,994 B2 | 9/2005 | Dharap | | |
| 6,976,093 B2 | 12/2005 | Lara et al. | | |
| 6,996,520 B2 * | 2/2006 | Levin | ................. | 704/10 |
| 7,260,518 B2 * | 8/2007 | Kerr et al. | ................. | 703/27 |
| 7,412,374 B1 * | 8/2008 | Seiler et al. | ................. | 704/8 |
| 7,516,115 B2 * | 4/2009 | Gupta | ................. | 1/1 |
| 2001/0029455 A1 * | 10/2001 | Chin et al. | ................. | 704/277 |
| 2002/0129096 A1 * | 9/2002 | Mansour et al. | ............. | 709/203 |
| 2002/0169592 A1 * | 11/2002 | Aityan | ................. | 704/2 |
| 2002/0173960 A1 * | 11/2002 | Ross et al. | ................. | 704/257 |
| 2003/0125927 A1 * | 7/2003 | Seme | ................. | 704/3 |
| 2003/0135569 A1 * | 7/2003 | Khakoo et al. | ............. | 709/206 |

(Continued)

OTHER PUBLICATIONS

"Plug-in for Internet Explorer", Solution Guide imTranslator.net <http://imtranslator.net/plugin-tr.asp> 1 page, Dec. 9, 2005.

(Continued)

*Primary Examiner*—Saleh Najjar
*Assistant Examiner*—Waseem Ashraf
(74) *Attorney, Agent, or Firm*—Leon R. Turkevich

(57) ABSTRACT

Language translation of instant messages between a sending party and a destination party is automatically performed, based on the instant messaging system automatically determining the respective language preferences of the sending and receiving parties. The instant messaging system automatically determines the respective language preferences based on existing subscriber profile attributes for the sending and receiving parties, and automatically translates between the respective language preferences, without the necessity of any manual user intervention by any of the parties during the instant messaging session.

29 Claims, 5 Drawing Sheets

U.S. PATENT DOCUMENTS

| | | | |
|---|---|---|---|
| 2003/0220972 A1* | 11/2003 | Montet et al. | 709/204 |
| 2003/0225885 A1* | 12/2003 | Rochberger et al. | 709/226 |
| 2003/0227916 A1* | 12/2003 | Paila et al. | 370/390 |
| 2004/0003041 A1* | 1/2004 | Moore et al. | 709/204 |
| 2004/0102956 A1* | 5/2004 | Levin | 704/2 |
| 2004/0127289 A1* | 7/2004 | Davis et al. | 463/42 |
| 2004/0158471 A1* | 8/2004 | Davis et al. | 704/277 |
| 2004/0261021 A1 | 12/2004 | Mittal et al. | |
| 2004/0267527 A1* | 12/2004 | Creamer et al. | 704/235 |
| 2005/0149499 A1 | 7/2005 | Franz et al. | |
| 2005/0198164 A1* | 9/2005 | Moore et al. | 709/206 |
| 2005/0209844 A1 | 9/2005 | Wu et al. | |
| 2005/0278544 A1* | 12/2005 | Baxter | 713/182 |
| 2005/0286519 A1 | 12/2005 | Ravikumar et al. | |
| 2005/0289463 A1 | 12/2005 | Wu et al. | |
| 2006/0034263 A1* | 2/2006 | Outhred et al. | 370/352 |
| 2006/0047615 A1* | 3/2006 | Ravin et al. | 706/50 |
| 2006/0095530 A1* | 5/2006 | Daniell et al. | 709/206 |
| 2006/0133585 A1* | 6/2006 | Daigle et al. | 379/88.06 |
| 2006/0167675 A1* | 7/2006 | Miyahira et al. | 704/2 |
| 2006/0206310 A1* | 9/2006 | Ravikumar et al. | 704/9 |
| 2007/0043567 A1* | 2/2007 | Gao et al. | 704/257 |
| 2007/0130155 A1* | 6/2007 | Alperin et al. | 707/10 |
| 2007/0143410 A1* | 6/2007 | Kraft et al. | 709/206 |
| 2008/0243472 A1* | 10/2008 | DeGroot et al. | 704/2 |
| 2008/0262828 A1* | 10/2008 | Och et al. | 704/3 |
| 2008/0281577 A1* | 11/2008 | Suzuki | 704/2 |

OTHER PUBLICATIONS

Daniel et al., "Using the IBM Workplace Instant Messaging SPI for language translation", <http://www-128.ibm.com/developerworks/lotus/library/wim-spi/> pp. 1-8, Dec. 1, 2005.

"SDL Chat Translator Help and FAQ", <http://www.chattranslator.com/help_and_faq/asp> pp. 1-6, Dec. 9, 2005.

"Google Language Tools", <http://www.google.com/language_tools> pp. 1-4, Dec. 9, 2005.

"News for nerds, stuff that matters", *Slashdot*, <http://slasjdot.org/article.pl?sid=06/01/05/1821210$from=rss> pp. 1-17, Jan. 6, 2006.

"Yahoo Translating Proxy", <http://www.ksc-creativecom/ytp/> 1 page, Jan. 6, 2006.

Enlarged image from "Yahoo Translating Proxy", <http://www.ksc-creativecom/ytp/> <http://www.ksc-creativecom/ytp/attach/YahooTranslatingProxy/all-w...> 1 page, Jan. 6, 2006.

Sneeringer, "IM Planet Spring 2003", <http://www.wave-report.com/conference_reports/2003/implanet2003s...> pp. 1-8, Dec. 27, 2005.

Deason, "White Paper, SIP and SOAP", Ubiquity Software Corporation White paper Release 1.0, May 2001, 11 pages.

Seltzer, "A Conversation with Peter Ford", <http://www.acmqueue.org/modules.php?name=Content&pa=printer_f...> pp. 1-9, Dec. 27, 2005.

Saint-Andre et al., "Interoperability between the Extensible Messaging and Presence Protocol (XMPP) and Session Initiation Protocol (SIP) Extensions for Instant Messaging and Presence", Internet Draft, IETF Network Working Group,<draft-saintandre-xmpp-simple-01>, Apr. 28, 2004, pp. 1-26.

Camarillo, "Framework for Transcoding with the Session Initiation Protocol (SIP)", Internet Draft, IETF SIPPING Working Group. <draft-ietf-sipping-transc-framework-02>, Jun. 1, 2005, pp. 1-10.

* cited by examiner

| Bob' IM Window  12a | Presence Server Translating | Herman IM window  12b |
|---|---|---|
| 1. Hi Herman, how are you. ← 62a | 1 → | 1. Hallo Herman, wie Sie sind. 72a |
| 1. Hello Bob. I am fine, as you are. 90 94 | ← 1  82 | 1. Hallo Bob. Ich bin fein, wie Sie sind. 72a 92 |
| 1. Hi Herman, how are you. ← 62a<br>2. Fine. Do you have some 15-20 mins free now ? | (1,2) → 62b | Hallo Herman, wie Sie sind. Fein. Haben Sie ca. 15-20 Minuten frei jetzt? 90  72b |
| Hello Bob. I am fine, as you are. Reliably you precede. 62a 90 94 | ← (1,2) | 1. Hallo Bob. Ich bin fein, wie Sie sind. 72a 92<br>2. Sicher gehen Sie voran. |
| 1. Hi Herman, how are you.<br>2. Fine. Do you have some 15-20 mins free now?<br>3. Herman I would like to discuss a Patent Idea. | (1,2,3) → 62b 62c | Hallo Herman, wie Sie sind. Fein. Haben Sie ca. 15-20 Minuten frei 72b jetzt? Herman I möchte eine Patentidee besprechen. 72c 72a 90 |
| 1. Herman, how are you. ← 62a<br>2. Fine. Do you have some 15-20 mins free now?<br>3. Herman I would like to discuss a Patent Idea.<br>4. This is about achieving automatic-translation in an IM session. | (1,2,3,4) → 62b 62c 62d | Hallo Herman, wie Sie sind. Fein. 72b Haben Sie ca. 15-20 Minuten frei jetzt? Herman I möchte eine 72c Patentidee besprechen. Dieses ist über das Erzielen von 72d Automatischübersetzung in einem Lernabschnitt IM. 90 |
| 2. Fine. Do you have some 15-20 mins free now?<br>3. Herman I would like to discuss a Patent Idea.<br>4. This is about achieving automatic-translation in an IM session<br>5. when two parties in session have different language preference. | (2,3,4,5) → 62b 72b 62c 72c 62d 62e | Fein. Haben Sie ca. 15-20 Minuten frei jetzt? Herman I möchte eine Patentidee besprechen. Dieses ist über das Erzielen von 72d Automatischübersetzung in einem Lernabschnitt IM, wenn zwei 72e Beteiligte im Lernabschnitt unterschiedliche Sprachpräferenz haben. 90 |

Figure 5

SERVER-INITIATED LANGUAGE TRANSLATION OF AN INSTANT MESSAGE BASED ON IDENTIFYING LANGUAGE ATTRIBUTES OF SENDING AND RECEIVING USERS

CROSS REFERENCE TO RELATED APPLICATIONS

This application claims priority from Provisional Application No. 60/758,546, filed Jan. 13, 2006, the disclosure of which is incorporated in its entirety herein by reference.

BACKGROUND OF THE INVENTION

1. Field of the Invention

The present invention relates to language translation resources configured for translating Instant Messages (IM) that are sent from a sending user to a receiving user.

2. Description of the Related Art

Computer-based language translation resources enable a user to translate a document or message from one language into another message. These translation resources rely on a user of a client device to initiate the translation. Hence, manual intervention is required by a client device to request translation of a document.

This requirement of manual intervention for translation also exists with instant messaging applications. One exemplary translation resource is the commercially-available "IM Translator for IE" (available from Smart Link Corporation at the Internet website "imtranslator.net/plugin-tr.asp"), which is an executable plug-in resource for the Microsoft Internet Explorer 5.5/6.x web browser that provides multilingual capabilities for Internet Explorer. Hence, this plug-in resource is implemented in the client device and executed in response to manual intervention by the user. Other exemplary translation resources executed in a client device include the commercially available "SDLChat Translator" (available from SDL International at the Internet website "freetranslation.com"), where a user initiates an executable instance of the translation resource and performs a manual assignment (i.e., association) of the translation resource instance with an instance of the instant messaging resource (i.e., the instant messaging window).

Translation software that is initiated in response to a user request also may reside on a server, for example in the form of web-based translation services such as the "Language Tools" web site offered by Google Corporation at the Internet web site "google.com/language_tools".

More advanced translation services are being integrated into instant messaging services, where a user sending an instant message may include with the message a request for the instant message to be translated using a servlet at the instant messaging server. For example, the commercially available IBM Workplace Instant Messaging Service Provider Interface (SPI) enables a user to request a translation servlet for translating instant messages as they are sent by the user. However, the translation servlet described by the IBM Workplace Instant Messaging SPI for language translation still requires the user to initiate the translation servlet.

Hence, the foregoing translation techniques require a user to manually request translation in order to enable translation of an instant message. Such techniques are inconvenient for destination parties receiving the instant messages, since the destination parties do not have any way for implementing automatic translation of the instant message without first notifying the sending party. Such notification may be impossible if the destination party does not know the language used by the sending party at all.

Another fundamental concern regarding computer-based language translation resources is that the quality of the translation will never be as good as a human translation, because a human translator is able to provide a more effective translation based on a thorough evaluation of the context of message content that is presented to the human translator by the message sender (i.e., source). For example, a human translator can evaluate the context of the content of a message based not only on message text (assuming the message is written), but also based on non-text attributes. Exemplary non-text attributes may include attributes of the message sender, such as the writer's profession which may affect the technical vocabulary (e.g., medical terms vs. engineering terms vs. legal terms), location of the message sender (which may reflect location-specific vernacular terms or expressions), age of the sender or time and/or date the message is sent (reflecting temporal-based or time-based vernacular terms or expressions), or if the message is spoken, then the inflection or intonation of the speaker presenting the message.

As apparent from the foregoing, however, determining message context from inflection or intonation of spoken text is not yet possible for computer-based systems, and computer-based language translation resource have not yet developed the sophistication to provide translation based on non-text attributes (e.g., technical vocabulary, vernacular, etc.). Use of a human interpreter between to parties of an instant messaging session is not a practical alternative.

SUMMARY OF THE INVENTION

There is a need for an arrangement that performs automatic translation of instant messages, without the necessity for any manual intervention by the sending party or the destination party.

There also is a need for an arrangement that performs automatic translation of instant messages, based on determining the respective language profiles of the sending party and the destination party.

There also is a need for an arrangement that automatically identifies whether automatic language translation of instant messages should be performed between the sending party and the destination party, or whether the parties should be notified that they should use a common alternate language that eliminates the need for any computer-based language translation.

These and other needs are attained by the present invention, where language translation of instant messages between a sending party and a destination party is automatically performed, based on the instant messaging system automatically determining the respective language preferences of the sending and receiving parties. The instant messaging system automatically determines the respective language preferences based on existing subscriber profile attributes for the sending and receiving parties, and automatically translates between the respective language preferences, without the necessity of any manual user intervention by any of the parties during the instant messaging session.

One aspect of the present invention provides a method in a server. The method includes detecting an instant message having been sent by a sending party for delivery to a destination party, the instant message expressed in a first language. The method also includes determining a language preference for the destination party to receive the instant message, independent of whether any translation request has been requested by the sending party. The method also includes causing translation of the instant message having been sent by the sending party into a translated instant message, expressed in a second language, based on the language preference for the destination party, and sending the translated instant message in the second language to the destination party.

Another aspect of the present invention provides an instant message communications system including a messaging resource, a presence resource, and a translation resource. The messaging resource is configured for detecting an instant message having been sent by a sending party for delivery to a destination party, the instant message expressed in a first language. The presence resource is configured for determining a language preference, for the destination party to receive the instant message, independent of whether any translation request has been requested by the sending party. The translation resource is configured for translating the instant message having been sent by the sending party into a translated instant message, expressed in second language, in response to a translation request from the messaging resource. The messaging resource is configured for sending the translation request based on the presence resource having determined the language preference for the destination party is distinct from the first language, and the messaging resource is configured for sending the translated instant message in the second language to the destination party.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 5 is a diagram illustrating context-based translation based on translation of an instant message relative to prior transmitted instant messages, according to an embodiment of the present invention.

BEST MODE FOR CARRYING OUT THE INVENTION

Figure 1:
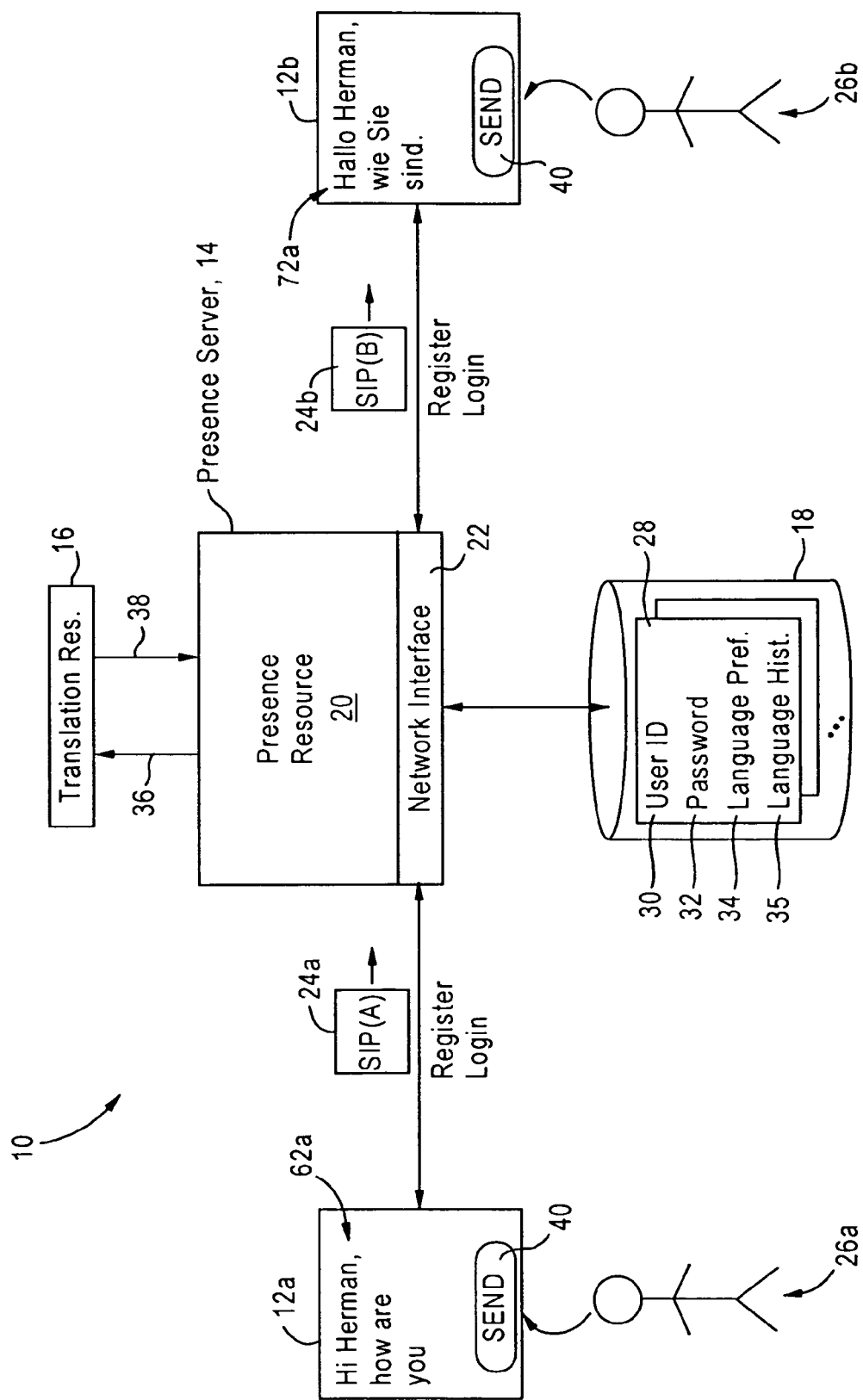
FIG. 1 is a diagram illustrating an instant message communications system for automatic translation of instant messages between instant messaging users, according to one embodiment of the present invention.

FIG. 1 is a diagram illustrating an instant message communications system 10 configured for automatic translation of the instant messages, according to an embodiment of the present invention. The instant message communications system 10 includes client devices 12a and 12b, a presence server 14 that acts as a messaging server, a translation resource 16, and a subscriber profile database 18.

The presence server 14 includes a presence resource 20 and a network interface 22. The network interface 22 is configured for detecting a network message 24a containing an instant message 62a and having been sent by a sending party 26a using the client device 12a for delivery to a destination party 26b using the client device 12b. In other words, the instant message 62a is not output from the client device 12a until the sending party 26a commits to sending his or her message to the destination party 26b, for example by pressing a "send" button 40 in the instant messaging user interface. As illustrated in FIG. 1, the instant message 62a, displayed on the display screen of the client device 12a as illustrated in further detail below with respect to FIG. 5, is expressed in a first language (e.g., English) utilized by the sending party 26a.

The presence resource 20 of the presence server 14 is configured for performing all instant messaging operations for the instant messaging system 10, including establishing the availability and identity of the sending party 26a in response to the sending party 26a registering with the presence resource 14 via the corresponding user device 12a, for example using a prescribed "login" procedure invoked on the client device 12a. The presence resource 20 also may be configured for establishing new subscriber accounts, and updating subscriber profile information as requested by a subscriber (e.g., 26a or 26b) based on accessing a corresponding subscriber attribute record 28 from the subscriber profile database 18.

Each subscriber attribute record 28 includes all information necessary for the presence resource 20 to provide instant messaging services with automated language translation, namely a user identifier 30, a password 32, and a language preference 34 attribute that is part of the subscriber profile information supplied by the user during initial subscription with the instant messaging service. The language preference attribute 34 specifies at least one preferred language that is utilized by the corresponding subscriber in communicating via the instant messaging service. In particular, since the sending party 26a prefers to use English and sends the instant message 62a in English, the corresponding language preference attributes 34 in the corresponding subscriber attribute record 28 specifies English as the preferred language; in contrast, the destination party 26b prefers to use German, hence the corresponding language preference attributes 34 in the corresponding subscriber attribute record 28 specifies German as the preferred language.

The presence resource 20 is configured for automatically loading the language preference attributes 34 of a corresponding subscriber (e.g., 26a, 26b) based on the corresponding subscriber registering with a presence server 14 for services, for example during a login procedure. Hence, the presence server 20, in response to the users 26a and 26b performing a corresponding registration with the presence resource 20, will load the respective language preferences 34 in order to perform dynamic language translation of the instant message 62a in the network message 24a from English into the German message 72a for delivery via the network message 24b.

Figure 2:
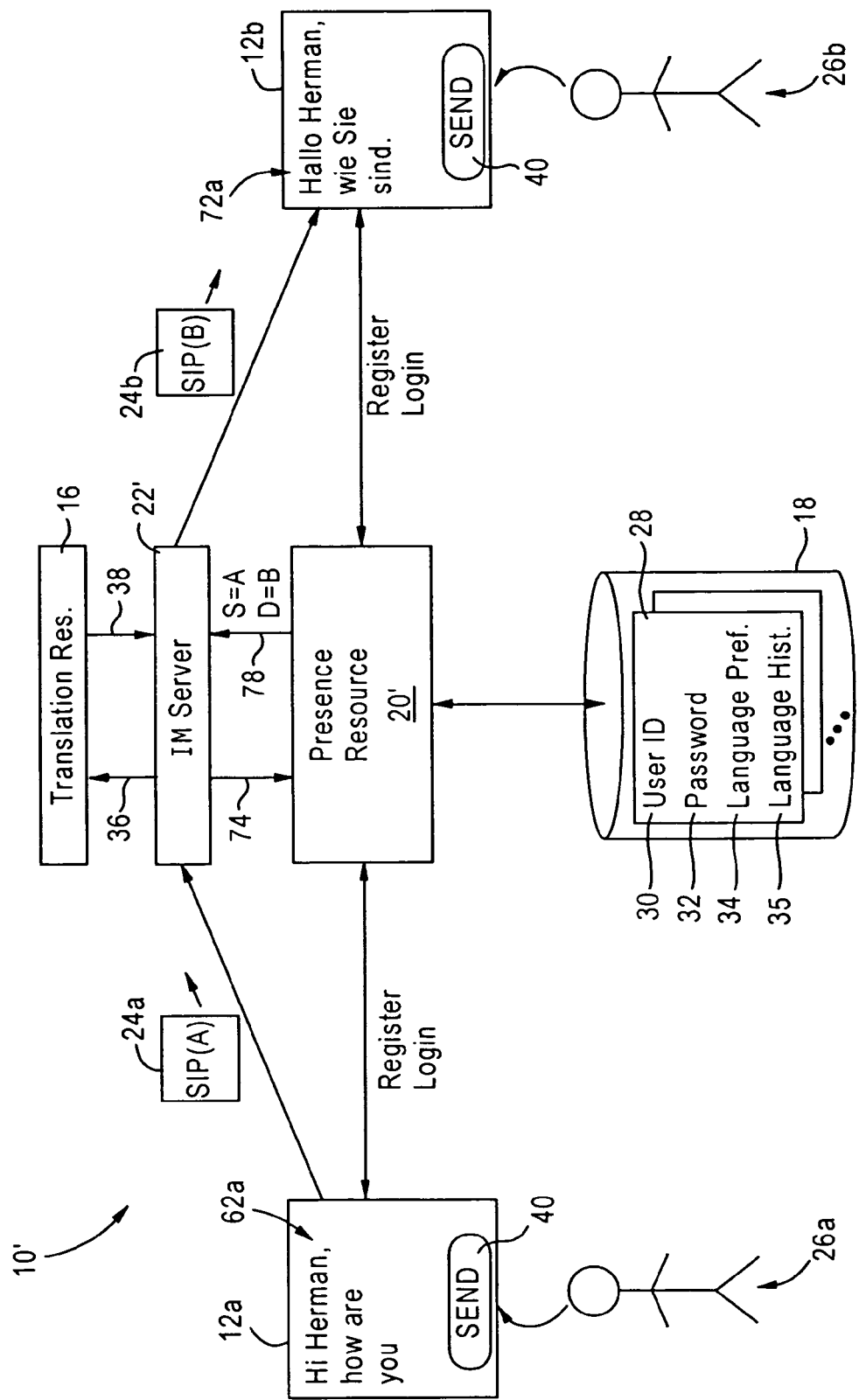
FIG. 2 is a diagram illustrating another instant message communications system for automatic translation of instant messages between instant messaging users, according to another embodiment of the present invention.

FIG. 2 is a diagram illustrating an alternate implementation 10' of the instant message communications system 10 of FIG. 1. The instant message communications system 10' of FIG. 2 differs in that the executable resources can be distributed throughout a network, as opposed to residing essentially in a single presence server 14, as illustrated in FIG. 1. In particular, the presence resource 20 and network interface 22 in the presence server 14 of FIG. 1 are implemented as distinct servers 20' and 22' having respective locations in the network 10'.

Hence, the presence resource 20' is configured for detecting the presence of the sending party 26a and 26b based on each corresponding party 26a and 26b performing a registration with the presence server 20', for example using a login procedure on the executable instant messaging user interface on the corresponding client device 12a and 12b; the presence resource 20' retrieves the corresponding subscriber attributes 28 from the database 18, including the language preference 34, to identify the relevant attributes for the subscriber having registered (logged in) for an instant messaging session using the corresponding instance of the user interface executed on the corresponding client device.

In response to the instant messaging server 22' detecting an instant message from the sending party 26a for delivery to the destination party 26b, the instant messaging server 22' accesses the presence server 20' (e.g., in the form of a query 74) to determine the attributes 28 for both the sending party 26a and the destination party 26b. The instant messaging server 22' also is configured for selectively sending a translation request 36 to the translation resource 16 in response to determining from the response 78 from the presence resource 20' that different language preferences 34 exist for the sending party 26a (S=A) and the destination party 26b (D=B). In response to receiving the translated message 38 from the translation resource 16, the instant messaging server 22' outputs the translated message in the second language to the destination party 26b.

Figure 3:
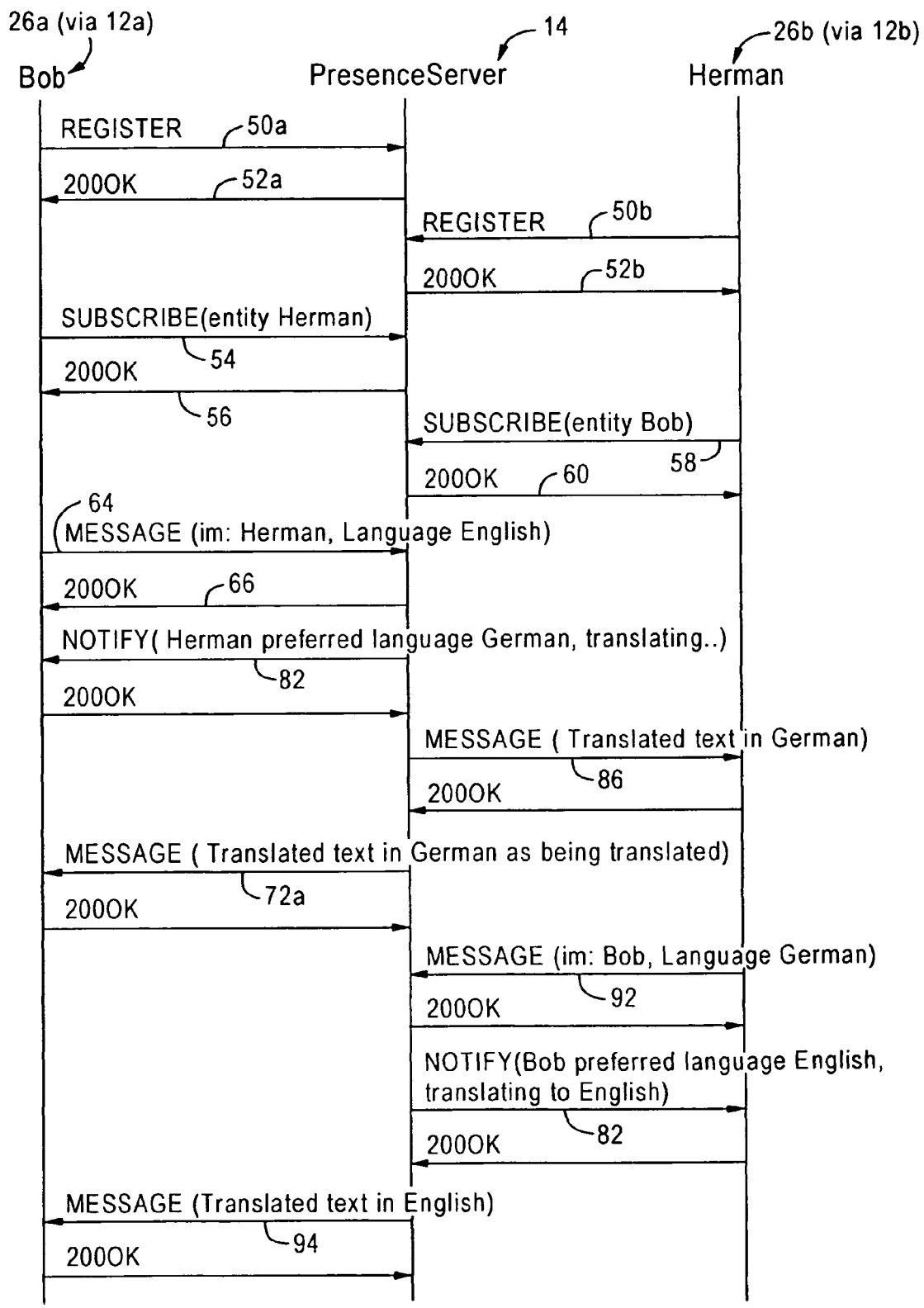
FIG. 3 is a diagram illustrating a message flow between instant messaging users and the presence server of FIG. 1, according to an embodiment of the present invention.
Figure 4:
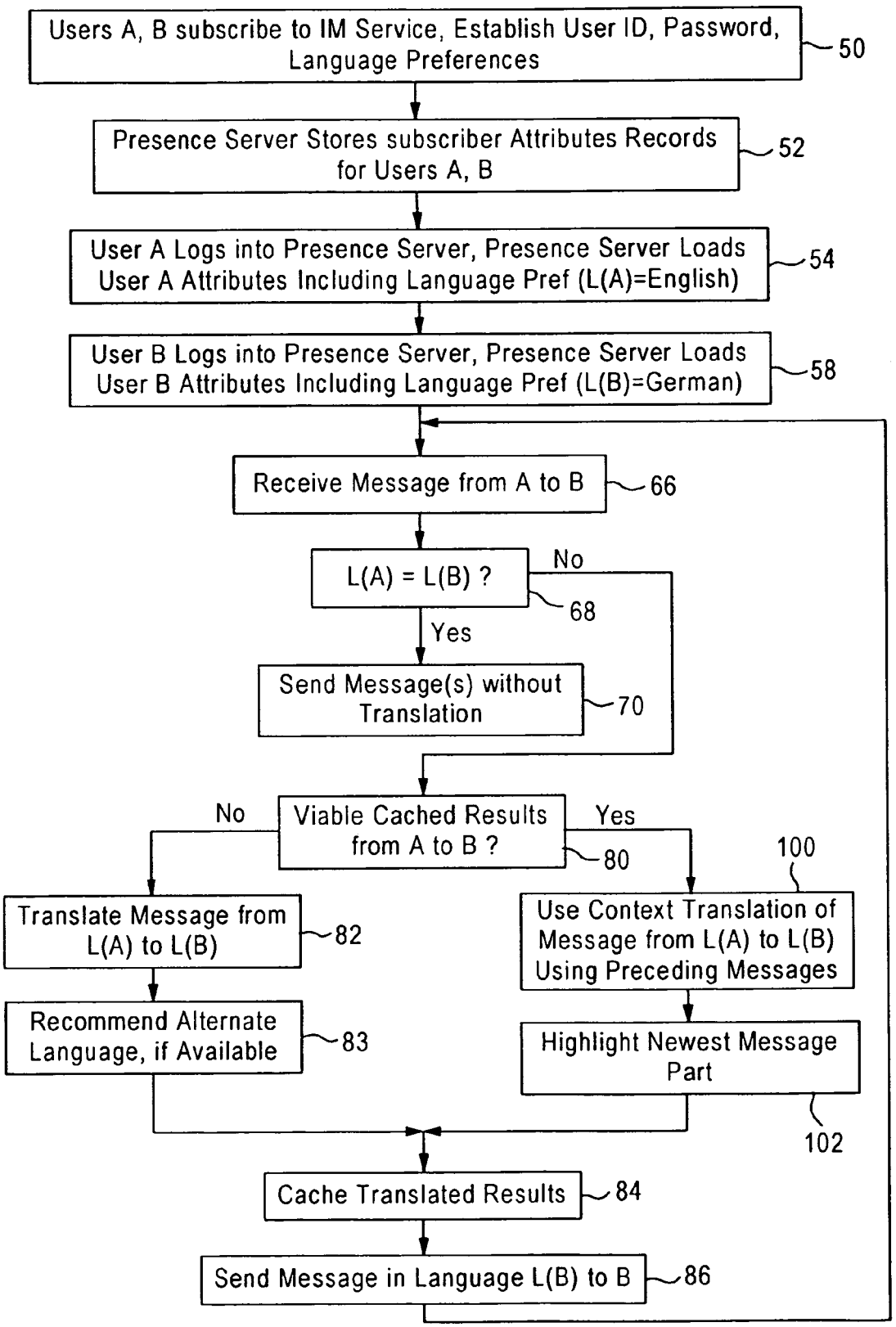
FIG. 4 is a diagram illustrating the method of automatic translation of instant messages between instant messaging users, according to an embodiment of the present invention.

FIG. 3 is a diagram illustrating a message flow between the user devices 12 of the instant messaging users in the presence server 14 of FIG. 1, according to an embodiment of the present invention. FIG. 4 is a diagram illustrating a method by the instant messaging system 10 of FIG. 1, or the instant messaging system 10' of FIG. 2, of providing automatic language translation between instant messaging users, according to an embodiment of the present invention. The steps described in FIGS. 3 and 4 can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

Referring to FIGS. 3 and 4, the method begins in step 50, where each of the users 26a and 26b register or subscribe (e.g., steps 50a and 50b of FIG. 3) with the presence resource 20 or 20' in order to establish their corresponding subscriber attribute records 28. The presence resource 20 or 20' stores in step 52 the subscriber attribute records 28 for the users 26a and 26b in step 52, then sends the respective acknowledgments 52a and 52b. The user 26a ("Bob") logs into the presence resource 20 or 20' in step 54, and adds that it wants to subscribe with the user 26b ("Herman") for a messaging session; the presence resource 20 or 20' adds the user 26b to the subscribed destinations list (e.g., "buddy list") of the user attributes 28 for the user 26a, and returns an acknowledgment (e.g., "200OK") to the device 12a in step 56. Also note that the presence resource 20 or 20' loads the attributes 28, including the language preference 34, into its application runtime memory at the time that the user 26a logs into the presence server resource 20 or 20'. The user 26b ("Herman") logs into the presence resource 20 or 20' in step 58, and adds that it wants to subscribe with the user 26a ("Bob") for a messaging session; the presence resource 20 or 20' adds the user 26a to the subscribed destinations list ("buddy list") of the user attributes 28 for the user 26b, and returns an acknowledgment to the user device 12b in step 60. Similar to step 54, the presence resource 20 or 20' loads the attributes 28 including the language preference 34 for the subscriber 26b into its application runtime memory at the time that the user 26b logs into the presence server resource 20 or 20'. Although not shown, it is readily apparent that the concurrent availability of each of the subscribers 26a and 26b can be displayed in "active list" windows in each of the user devices 12a and 12b.

The user 26a, in response to observing the availability of the subscriber 26, can begin composing a message 62a, illustrated in FIG. 5, and sends the message 62a in step 64 by pressing the send key 40 on the user interface 12a: pressing the send key 40 commits the user 26a in step 64 to the transmission of the message 24a containing the message 62a. According to the disclosed embodiment, the presence server 14 can be implemented as a server configured for sending messages according to a prescribed protocol, for example Session Initiation Protocol (SIP); hence, the message 62a is enclosed within a SIP message 24a that is output by the user interface 12a in step 64 of FIG. 3 to the network interface 22 of FIG. 1 or the instant messaging server 22' of FIG. 2. The SIP message 24a specifies the instant message 62a and the destination party 26b. Additional examples of implementing the disclosed Instant Messaging service based on transfer of the SIP messages (e.g., 24a, 24b) are illustrated in the attached Appendix.

The network interface 22 of FIG. 1 or the instant messaging server 22' of FIG. 2 detect in step 66 the instant message 62a within the SIP message 24a that specifies the destination party 26b, and in response causes the presence resource 20 or 20' to compare in step 68 the respective language preferences 34 for the sending party 26a (L(A)) and the destination party 26b (L(B)). If in step 68 the language preferences are the same (L(A)=L(B)), the message 24a is sent in step 70 without translation of the message 62a.

If the presence resource 20 or 20' determines in step 68 that the respective language preferences 34 for the sending party 26a and the destination party 26b are not the same, the presence resource 20 of FIG. 1 sends a translation request 36 to the translation resource 16 that includes the message 62a, and the source and destination language preferences 34. In the case of the presence resource 20' of FIG. 2, the presence resource 20' responds to a subscriber query 74 from the instant messaging server 22', requesting the respective language preferences 34 of the identified sending party 26a and the identified destination party 26b, by sending a reply 78 specifying the respective language preferences of the sending and destination parties. Hence, the instant messaging server 22', in response to detecting a difference in the respective language preferences, sends the translation request 36 to the translation resource 16. Note that in each case the decision in step 68 to translate the message 62a is performed after the sending party 26a has committed to send the message 62a (by pressing the send key 40) and regardless of whether any translation request has been supplied by the user, hence the decision in step 68 to translate the message 62a is independent of whether any translation request is made by the user 26a.

The translation resource 16 translates in step 82 the instant message 62a sent by the sending party 26a into a translated instant message 38, illustrated as the translated instant message 72a in FIG. 5, based on receiving the translation request 36 specifying the source language, the destination language, and the instant message 62a. Since this is the first message from the sending party 26a to the destination party 26b, the presence resource 20 or the instant messaging server 22' does not include any cached translation results in step 80 within the translation request 36.

The foregoing example is applicable when each party 26a and 26h has only a single corresponding language preference, for example the sending party 26a uses only English (L(A) =English), and the destination party 26b uses only German (L(B)=German). However, a more sophisticated negotiation can be performed by the presence resource 20 or 20' in the case where both parties 26a and 26b have multiple available languages: in this case, the presence resource 20 or 20' identifies an optimum language for the messaging sessions, based on either an identified common alternate language, or based on identifying a highest quality from prior messaging sessions between the parties 26a and 26b.

In particular, the presence resource 20 or 20' is configured for determining the language preference for the destination party based on learning which language to translate to. If the sending party 26a and/or the receiving party 26b speaks more than one language, as indicated by the language preferences 34, the presence resource 20 or 20' can be configured for notifying the sending party 26a that the language is being translated, and providing the sending party 26a the opportunity to choose an alternate language. The presence resource 20 or 20' can respond to the language choice by the sending party 26a by updating the language preference 34 so that any future discussions between parties 26a and 26b automatically use the chosen alternate language as the default language.

For example, if the descending order of language proficiency for sending party 26a is English, Spanish, then Italian (i.e., most proficient in English, least proficient in Italian), and the descending order of language proficiency for the destination party 26b is French then Spanish (more proficient in French than Spanish), then the presence resource 20 or 20' could provide the feedback in step 83 to the originator 26a that Spanish would be a better language to type in, based on determining from the respective attributes 34 the that Spanish is an alternate language that is common to both parties 26a and 26b, and which has the highest relative level of proficiency between the two parties 26a and 26b.

In addition, the presence resource 20 or 20' can optionally store histories 35 of prior messaging sessions between the parties 26a and 26b, each history 35 storing for each messaging session the languages used and the quality of the messaging session. In particular, each history entry 35 specifies the languages used by each party 26a and 26b for each prior messaging session, regardless of whether any translation was used; in addition, the presence resource 20 or 20' may use additional executable resources to monitor and assess the quality of the messaging session, for example rating the conversation based on grammar, spelling, usage, etc. of the language that is used by either party 26a or 26b: the quality is measured to assess if the relative proficiency in using an alternate language by one of the users 26a or 26b exceeds the expected quality of translation by the translation resource 16.

Hence, if the relative proficiency in the alternate language exceeds the expected quality of translation, the presence resource 20 or 20' will recommend continued use of the alternate language, but if the relative proficiency in the alternate language is less than the expected quality of translation, the presence resource 20 or 20' will recommend each party 26a and 26b uses his or her default language preference to invoke automated language translation by the translation resource 16. The languages used and the respective quality of the messaging sessions can be accumulated as a histogram that enables the presence resource 20 or 20' to identify the language that the sending party 26a should use for a given destination party 26b to ensure the best quality messaging session.

Hence instead of performing translation by the translation resource 16 it may be preferable for the presence resource 20 or 20' to suggest to the sending party 26a to switch languages (e.g., by providing the reminder to the sending party 26a in step 83 that Spanish should be used for the destination party 26b). Consequently if during the conversation the two participants 26a and 26b decide to switch back to using their respective primary languages (English, French) then the presence resource 20 (or the IM server 22' and presence resource 20') can detect the language change by examining the text being sent and note the preference in the language preferences 34, in combination with monitoring and storing the results (including messaging quality) in the language history 35.

Also note that the notification to use a given language for a given destination party 26b may be supplied to the sending party 26a during initial subscriber login in step 54, where in response to the login by the sending party 26a, the presence resource 20 or 20' supplies to the device 12a of the sending party the list of available destination parties 26b ("Buddy List"), where each entry includes the recommended language as described above with respect to step 83.

Referring back to generation of the translated message 38 in step 82, the translation results are cached for subsequent context-based translation in step 100. Specifically, in response to receiving the translated instant message 38 from the translation resource 16, the presence resource 22 of FIG. 1 or the instant messaging server 22' of FIG. 2 caches the translation results in step 84, and outputs in step 86 a second SIP message 24b containing the translated instant message 38, illustrated as 72a in FIG. 5. FIG. 3 also illustrates acknowledgment messages transferred between the user devices and the presence server 14, as needed. As illustrated in FIG. 3, the presence server 14 also may output a copy of the translated text 72a to the device 12a of the sending party 26a as a feedback mechanism.

Hence, the instant messaging system automatically translates the instant message 62a sent by the sending party 26a into the translated instant message 72a displayed on the user device 12b for the user 26b, illustrated in FIG. 5. Similar translation operations may be performed for messages 92 sent by the user 26b for the user 26a, resulting in the translated messages 94. As described below, each translated message includes a highlighted portion 90 that identifies the most recent translation relative to prior transmitted messages.

As illustrated in FIGS. 4 and 5, a sequence of instant messages may be exchanged between the instant messaging users 26a and 26b. Hence, it is highly desirable that the translation operations reflect the context of the transmitted sequence of messages. In particular, the sequence of transmitted messages 62a, 62b, 62c, 62d, and 62e by the sending party 26a typically will have a shared context that may be used to optimize translation, as opposed to attempting translation of each individual transmitted message 62a, 62b, 62c, 62d and 62e in isolation without applying any of the shared context among the messages.

According to the disclosed embodiment, the cached results of prior translations in step 84 are selectively supplied in step 80 by the presence resource 20 or the instant messaging server 22' to the translation resource 16 in order to provide improved context-based translation, based on determining that the cached results are viable. In other words, the presence resource 20 or the instant messaging server 22' may optionally clear the cache if a message had been received from B to A, or if a determined time interval has elapsed that renders the cached results "stale" (i.e., "aged") and therefore no longer viable.

The context based translation is performed in step 100 based on applying the cached translation results to the subsequent message. For example, the cached translation results of translating the original message message 62a into the translated message 72a are used for translating the subsequent message 62b into the translated message 72b; the cached translation results of messages 62a and 62b for creating the translated message 72b are used for translating the subsequent message 62c into the translated message 72c; the cached translation results of messages 62a, 62b and 62c for creating the translated message 72c are used for translating the subsequent message 62d into the translated message 72d; and the cached translation results of messages 62a, 62b 62c and 62d for creating the translated message 72d are used for translating the subsequent message 62e into the translated message 72e. Hence, a given instant message (e.g., 62e) is translated relative to the context of the sequence of prior transmitted instant messages (e.g., 62a, 62b, 62c, and 62d).

The presence resource 20 or the instant messaging server 22' also is configured for causing in step 102 the newest message part having been most recently translated to be highlighted by the user device 12b receiving the translated message (e.g., 72e), relative to the prior translated instant messages (e.g., 72a, 72b, 72c, and 72d), for example by inserting a text attributes tag that identifies the new text to be highlighted as a highlighted portion (shown in bold face) 90.

According to the disclosed embodiment, instant messages are automatically translated based on the network-based server determining a difference in the language preferences of the sending party and the receiving party. Further, context-based translation is applied to provide more accurate, context-based translations.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server, the method comprising:
   detecting by the server an instant message having been sent by a sending party for delivery to a destination party, the instant message expressed in a first language;
   determining by the server a language preference for the destination party to receive the instant message, the determining being independent of whether any translation request has been requested by the sending party;
   selectively clearing by the server a cache that stores translation results of prior transmitted instant messages having been sent by the sending party, based on the server determining the translation results of the prior transmitted instant messages are no longer viable for context-based translation of the instant message;
   the server causing translation of the instant message having been sent by the sending party into a translated instant message, expressed in a second language, based on the language preference for the destination party, wherein the instant message follows a sequence of the prior transmitted instant messages having been sent by the sending party and having been translated and sent to the destination party in the second language, the causing translation including causing translation of the instant message relative to a context of the sequence of prior transmitted instant messages based on the server retrieving from the cache the translation results of the prior transmitted instant messages determined as viable to the context-based translation of the instant message, and initiating the context-based translation of the instant message relative to the translation results; and
   sending by the server the translated instant message in the second language to the destination party.

2. The method of claim 1, wherein the determining includes accessing a subscriber attributes record for retrieval of stored language preference attributes having been set by the destination party for receipt of instant messages.

3. The method of claim 2, further comprising detecting a presence of each of the sending party and the destination party for transfer of instant messages based on a corresponding registration with the server, the determining including determining the language preference for the destination party in response to detecting the corresponding presence.

4. The method of claim 3, further comprising detecting that the instant message is expressed in the first language based on determining the corresponding language preference for the sending party specifies the first language, the translating based on a determined difference between the language preference for the sending party in the language preference for the destination party.

5. The method of claim 3, wherein the detecting of the instant message includes receiving a Session Initiation Protocol (SIP) message that includes the instant message.

6. The method of claim 1, wherein the sending includes causing the translated instant message to be highlighted by a registered device of the destination party, relative to the sequence of prior transmitted instant messages having been translated and sent to the destination party in the second language.

7. The method of claim 1, further comprising sending a notification to the sending party recommending use of a third language, distinct from the first language, for messages destined to the destination party, based on identifying the third language as usable by the sending party and the receiving party.

8. An instant message communications system comprising:
   a messaging resource configured for detecting an instant message having been sent by a sending party for delivery to a destination party, the instant message expressed in a first language;
   a presence resource configured for determining a language preference, for the destination party to receive the instant message, independent of whether any translation request has been requested by the sending party, wherein at least one of the messaging resource or the presence resource is configured for selectively clearing a cache that stores translation results of prior transmitted instant messages having been sent by the sending party, based on the messaging resource or the presence resource determining the translation results of the prior transmitted instant messages are no longer viable for context-based translation of the instant message; and
   a translation resource configured for translating the instant message having been sent by the sending party into a translated instant message, expressed in second language, in response to a translation request from the messaging resource, the messaging resource configured for sending the translation request based on the presence resource having determined the language preference for the destination party is distinct from the first language, wherein the instant message follows a sequence of prior transmitted instant messages having been sent by the sending party and having been translated and sent to the destination party in the second language, the translation resource translating the instant message relative to a context of the sequence of prior transmitted instant messages based on retrieval from the cache of the translation results of the prior transmitted instant messages determined as viable to the context-based translation of the instant message, and initiating the context-based translation of the instant message relative to the translation results;

the messaging resource configured for sending the translated instant message in the second language to the destination party.

9. The system of claim 8, wherein the presence resource is configured for determining the language preference based on accessing a subscriber attributes record for retrieval of stored language preference attributes having been set by the destination party for receipt of instant messages.

10. The system of claim 9, wherein the presence resource is configured for detecting a presence of each of the sending party and the destination party for transfer of instant messages in response to a corresponding registration with the presence resource, the presence resource configured for determining the language preference for the destination party in response to detecting the corresponding presence.

11. The system of claim 10, wherein the presence resource is configured for detecting that the instant message is expressed in the first language based on determining the corresponding language preference for the sending party specifies the first language.

12. The system of claim 10, wherein the messaging resource is configured for receiving a Session Initiation Protocol (SIP) message that includes the instant message.

13. The system of claim 8, wherein the message resource is configured for causing the translated instant message to be highlighted by a registered device of the destination party, relative to the sequence of prior transmitted instant messages having been translated and sent to the destination party in the second language.

14. The system of claim 8, wherein the presence resource is configured for sending a notification to the sending party recommending use of a third language, distinct from the first language, for messages destined to the destination party, based on identifying the third language as usable by the sending party and the receiving party.

15. A server comprising:
a network interface configured for detecting an instant message having been sent by a sending party for delivery to a destination party, the instant message expressed in a first language; and
a presence resource configured for determining a language preference for the destination party to receive the instant message and independent of whether any translation request has been requested by the sending party, the presence resource further configured for selectively clearing a cache storing translation results of prior transmitted instant messages having been sent by the sending party based on the presence resource determining the translation results of the prior transmitted instant messages are no longer viable for context-based translation of the instant message, the presence resource further configured for invoking a translation resource for translation of the instant message into a translated instant message, expressed in a second language, based on the presence resource having determined the language preference for the destination party is distinct from the first language, wherein the instant message follows a sequence of the prior transmitted instant messages having been sent by the sending party and having been translated and sent to the destination party in the second language, the translation resource translating the instant message relative to a context of the sequence of prior transmitted instant messages based on retrieval from the cache of the translation results of the prior transmitted instant messages determined as viable to the context-based translation of the instant message, and the translation resource initiating the context-based translation of the instant message relative to the translation results;

the network interface configured for outputting the translated instant message in the second language to the destination party.

16. The server of claim 15, wherein the presence resource is configured for determining the language preference based on accessing a subscriber attributes record for retrieval of stored language preference attributes having been set by the destination party for receipt of instant messages.

17. The server of claim 16, wherein the presence resource is configured for detecting a presence of each of the sending party and the destination party for transfer of instant messages in response to a corresponding registration with the presence resource, the presence resource configured for determining the language preference for the destination party in response to detecting the corresponding presence.

18. The server of claim 17, wherein the presence resource is configured for detecting that the instant message is expressed in the first language based on determining the corresponding language preference for the sending party specifies the first language.

19. The server of claim 17, wherein the network interface is configured for receiving a Session Initiation Protocol (SIP) message that includes the instant message.

20. The server of claim 15, wherein the presence resource is configured for causing the translated instant message to be highlighted by a registered device of the destination party, relative to the sequence of prior transmitted instant messages having been translated and sent to the destination party in the second language.

21. The server of claim 15, wherein the presence resource is configured for sending a notification to the sending party recommending use of a third language, distinct from the first language, for messages destined to the destination party, based on identifying the third language as usable by the sending party and the receiving party.

22. A non-transitory computer readable medium having stored thereon sequences of instructions for translation of an instant message by a server, the sequences of instructions including instructions for: detecting by the server an instant message having been sent by a sending party for delivery to a destination party, the instant message expressed in a first language; determining by the server a language preference for the destination party to receive the instant message, the determining being independent of whether any translation request has been requested by the sending party; selectively clearing by the server a cache that stores translation results of prior transmitted instant messages having been sent by the sending party, based on the server determining the translation results of the prior transmitted instant messages are no longer viable for context-based translation of the instant message; the server causing translation of the instant message having been sent by the sending party into a translated instant message, expressed in a second language, based on the language preference for the destination party, wherein the instant message follows a sequence of the prior transmitted instant messages having been sent by the sending party and having been translated and sent to the destination party in the second language, the causing translation including causing translation of the instant message relative to a context of the sequence of prior transmitted instant messages based on the server retrieving from the cache the translation results of the prior transmitted instant messages determined as viable to the context-based translation of the instant message, and initiating the context-based translation of the instant message relative to the translation results; and sending by the server the translated instant message in the second language to the destination party.

23. The medium of claim 22, wherein the determining includes accessing a subscriber attributes record for retrieval of stored language preference attributes having been set by the destination party for receipt of instant messages.

24. The medium of claim 23, further comprising instructions for detecting a presence of each of the sending party and the destination party for transfer of instant messages based on a corresponding registration with the server, the determining including determining the language preference for the destination party in response to detecting the corresponding presence.

25. The medium of claim 24, further comprising instructions for detecting that the instant message is expressed in the first language based on determining the corresponding language preference for the sending party specifies the first language, the translating based on a determined difference between the language preference for the sending party in the language preference for the destination party.

26. The medium of claim 24, wherein the detecting of the instant message includes receiving a Session Initiation Protocol (SIP) message that includes the instant message.

27. The medium of claim 22, wherein the sending includes causing the translated instant message to be highlighted by a registered device of the destination party, relative to the sequence of prior transmitted instant messages having been translated and sent to the destination party in the second language.

28. The medium of claim 22, further comprising instructions for sending a notification to the sending party recommending use of a third language, distinct from the first language, for messages destined to the destination party, based on identifying the third language as usable by the sending party and the receiving party.

29. A server comprising:

means for detecting an instant message having been sent by a sending party for delivery to a destination party, the instant message expressed in a first language; and means for determining a language preference for the destination party to receive the instant message and independent of whether any translation request has been requested by the sending party, the means for determining further configured for selectively clearing a cache storing translation results of prior transmitted instant messages having been sent by the sending party based on the presence resource determining the translation results of the prior transmitted instant messages are no longer viable for context-based translation of the instant message, the means for determining further configured for invoking a translation resource for translation of the instant message into a translated instant message, expressed in a second language, based on the means for determining having determined the language preference for the destination party is distinct from the first language, wherein the instant message follows a sequence of the prior transmitted instant messages having been sent by the sending party and having been translated and sent to the destination party in the second language, the translation resource translating the instant message relative to a context of the sequence of prior transmitted instant messages based on retrieval from the cache of the translation results of the prior transmitted instant messages determined as viable to the context-based translation of the instant message, and the translation resource initiating the context-based translation of the instant message relative to the translation results;

the means for detecting configured for outputting the translated instant message in the second language to the destination party.

* * * * *